3,284,545
PROCESSING AND STABILIZING AIDS FOR
VINYL CHLORIDE RESINS
Harry J. Cenci, Warminster, and Marvin J. Hurwitz,
Elkins Park, Pa., assignors to Rohm & Haas Company,
Philadelphia, Pa., a corporation of Delaware
No Drawing. Filed Dec. 8, 1964, Ser. No. 416,896
6 Claims. (Cl. 260—899)

This invention relates to homogeneous thermoplastic vinyl chloride resin compositions possessing excellent physical properties and, more particularly, to hard, tough, and rigid but processable compositions comprising an intimate mixture or blend of a vinyl chloride resin and an acrylic copolymer having pendant oxetane groups.

Rigid vinyl chloride resinous compositions; i.e., compositions containing less than about 5 to 10% plasticizer, are characterized by a high degree of resistance to chemical attack, by outstanding solvent resistance, by good weathering resistance, and by a high strength to weight ratio and, consequently, have come into extensive use in the chemical processing and building and construction industries. Rigid vinyl chloride resin compositions are presently finding use in such applications as, for example, chemical processing equipment, pipes and pipe fittings, moldings, sheeting, building panels, etc. The processing of rigid resinous vinyl chloride products is not, however, accomplished without serious problems and difficulty. One problem is that the extrusion or milling temperatures are extremely close to the point at which the material will degrade and the utmost care must be exercized during extrusion or milling not to exceed the degradation temperature by any significant amount. Moreover, rigid vinyl chloride resins do not achieve melt flow as readily as other thermoplastics but instead are somewhat more viscous during processing. This subjects the resins to a high shear which in turn creates additional heat, further tending to cause the material to degrade and break down. It is thus apparent that there is great need for an additive which will both aid the processing and stabilization of rigid vinyl chloride resins.

The processing and stabilization aids employed in the composition of the present invention are acrylic copolymers having pendant oxetane groups and are characterized by being essentially uncrosslinked or linear and solvent-soluble such as in toluene. Also, they are characterized by the fact that at least 85% of the theoretical oxetane groups are intact in the copolymer. The monomers used in producing the acrylic copolymers are methyl methacrylate, ethyl acrylate and an ether represented by the following formula

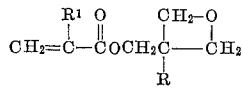

in which R is an alkyl group of one to four carbon atoms, preferably one to two carbon atoms, such as methyl, ethyl, isopropyl, or butyl, and R¹ is a hydrogen atom or a methyl group. The preferred acrylic copolymers utilize 3-ethyloxetane-3-methyl methacrylate as the ether ester.

The respective proportions or amounts of the monomers in the copolymer additive may vary as follows: 20 to 98.5 percent by weight for the methyl methacrylate; 0.5 to 40 percent by weight for the ethyl acrylate; and 1 to 40 percent by weight for the ether ester. The preferred ranges for the methyl methacrylate, ethyl acrylate and ether ester, respectively, are 45 to 90; 5 to 35; and 5 to 20 percent by weight. The molecular weight of the copolymer additive ranges from 150,000 to 2,000,000, of which the range 300,000 to 1,500,000 is preferred.

The ratio of the summation of methyl methacrylate and 3-alkyloxetanemethyl methacrylate to ethyl acrylate is from 60:40 to 99.5:05 by weight. A characteristic which suits the polymer for certain applications particularly well is its particle size. It is advantageous that no more than 30 to 60% of the copolymer be retained on a 200-mesh screen. For certain applications like hot roll calendering and extrusion application, it is desirable that no more than 10% of the copolymer be retained on a 100-mesh screen.

In physical appearance, the copolymer is ordinarily of particulated, granulated particles that are uneven and solid (not hollow). The viscosity of the copolymer is A to Z–10 on the Gardner-Holdt scale (a 10% solution in toluene), the preference being D to Z–2.

The copolymer additives of the invention may be made by a variety of methods. One suitable method is by bulk polymerization of the monomeric ingredients. In accordance with that process a suitable amount of monomers is mixed with an addition polymerization catalyst, such as azobisisobutyronitrile, at a temperature sufficient to cause polymerization such as in the range of 25° to 100° C. or higher. Another suitable method for making the copolymer of the invention is by an aqueous dispersion method. In this procedure the necessary copolymerizable monomers are polymerized as an emulsion in the presence of a suitable emulsifying agent such as sodium dodecylbenzene sulfonate or sodium lauryl sulfate, and the resulting polymer is recovered by a suitable method.

The vinyl chloride resins useful in this invention include homopolymers of vinyl chloride as well as copolymers thereof with minor proportions of other ethylenically unsaturated compounds. Preferably, the vinyl chloride resin employed is a homopolymer of vinyl chloride, i.e., polyvinyl chloride, since the most rigid compositions are ultimately obtainable therefrom. However, the vinyl chloride resin can also contain up to about twenty percent by weight of other ethylenically unsaturated compounds copolymerizable with vinyl chloride; conversely stated, the resin should contain at least about 80 percent by weight of vinyl chloride copolymerized therein. Other ethylenically unsaturated compounds which are suitable in this respect include, for example, vinyl alkanoate, such as vinyl acetate, vinyl propionate and the like; vinyl halides, such as vinylidene bromide, vinylidene chloride, vinylidene fluorochloride, and the like; unsaturated hydrocarbons, such as ethylene, propylene, isobutylene and the like; allyl compounds such as allyl acetate, allyl chloride, allyl ethyl ether and the like, etc. Thus, as employed herein, the term "vinyl chloride resin" is meant to include both polyvinyl chloride and copolymers of vinyl chloride and other ethylenically unsaturated monomers.

The molecular weight of the vinyl chloride resins suitable for use in this invention can vary over a wide range. Preferably, however, the vinyl chloride resin utilized is one having a medium to high molecular weight. An indication of the molecular weight of those vinyl chloride resins particularly useful in this invention may be obtained by reference to the resin's Fikentscher K-value, and those resins having a Fikentscher K-value higher than 45 and preferably between 60 and 90 or higher may be taken as conforming to the molecular weight requirement mentioned above.

The vinyl chloride resin compositions of the invention contain the acrylic copolymer additive in amounts sufficient to give satisfactory processing and stabilization aid. Generally, this amount is kept to a minimum, consistent with the benefits desired. In practice, an amount in the range of 0.5 to 15% by weight based upon the vinyl chloride resin is generally adequate although sometimes it may be desirable to increase the amount of copolymer to amounts beyond 15%, such as 25% or more. Amounts smaller than 0.5% may also be employed when the benefits are adequate for the purposes intended.

By using the acrylic copolymer additive, there is formed a blend with vinyl chloride resins which is an extrudable, millable and workable plastic composition. A smooth, flexible polyvinyl chloride sheet is formed during processing by the use of the terpolymer or acrylic copolymer additive which upon cooling gives a rigid product which is a homogeneous blend of the vinyl chloride resin and the copolymer. This composition exhibits excellent thermal stability. It also has very good light stability. Moreover, the composition retains an unusually high heat distortion temperature.

In the vinyl chloride resin compositions of the invention there may be used in addition to the copolymer additional materials such as extenders, fillers, dyes, pigments, and stabilizers. The copolymers may be the sole processing aid employed, or they may be used in conjunction with other conventional materials.

The examples which are provided below are merely illustrative of the invention. All parts and percentages are by weight unless otherwise mentioned. The following abbreviations are used: MMA for methyl methacrylate, EA for ethyl acrylate, and EOMMA for 3-ethyloxetane-3-methyl methacrylate.

EXAMPLE 1

*Preparation of EOMMA monomer*

There are added to a reaction vessel 232 parts of 3-ethyloxetane-3-methanol, 200 parts of methyl methacrylate, 3 parts of tetraisopropyltitanate, and 4 parts of diphenyl-p-phenylenediamine. The reaction mixture is heated under a 5-inch column and a conventional head for 4½ hours during which time the theoretical amount of methanol is collected. The product is distilled at 59° to 61° C. at 0.3 mm. absolute pressure, giving an 88% yield of 3-ethyloxetane-3-methyl methacrylate. The product has $n_D^{25}$ 1.4546. The product gives on analysis the following:

Calcd. for $C_{10}H_{16}O_3$: Saponification No. 304.5; oxetane oxygen 8.69%. Found: Saponification No. 305; oxetane oxygen, 8.4%.

EXAMPLE 2

*Preparation of a MMA/EA/EOMMA terpolymer (80/10/10)*

Into a 3-liter, 3-necked flask equipped with a stirrer, thermometer, nitrogen inlet and a reflux condenser there are charged 1632 parts deionized water, 8 parts of sodium lauryl sulfate, 640 parts methyl methacrylate, and 80 parts ethyl acrylate. The stirred emulsion is sparged overnight with nitrogen at ca. 30 ml. per minute. There are then added 80 parts of 3-ethyloxetane-3-methyl methacrylate, 6 parts of a 35% solution of hydrogen peroxide and 2.4 parts sodium formaldehyde sulfoxylate dihydrate dissolved in 25 parts deionized water. In 15 minutes the stirred emulsion exotherms, and in 41 minutes the reaction reaches a peak temperature of 76° C. After cooling to room temperature the emulsion is neutralized with 200 parts of 0.1 N sodium hydroxide. A portion of the emulsion containing about 267 parts solid is coagulated by adding to it 4 liters of stirred methanol. After drying to constant weight there are obtained 261 parts of a white powder which is soluble in toluene, has a Gardner-Holdt viscosity of Q–R (5% in toluene) and an oxetane oxygen value of 0.87% (theory 0.87%).

A second portion of the emulsion is isolated and thereafter spray dried to give a fine white powder which is soluble in toluene, has a Gardner-Holdt viscosity of M–N (5% in toluene) and an oxetane oxygen value of 0.82% (theory 0.87%).

EXAMPLE 3

*Preparation of a MMA/EA/EOMMA terpolymer (80/10/5)*

Into a 3-liter, 3-necked flask equipped with a stirrer, thermometer, nitrogen inlet and a reflux condenser there are charged 1632 parts deionized water, 8 parts sodium lauryl sulfate, 680 parts methyl methacrylate and 80 parts ethyl acrylate. The stirred emulsion is sparged with nitrogen overnight. The next day there are added 40 parts 3-ethyloxetane-3-methyl methacrylate, 6 parts of a 35% solution hydrogen peroxide, and 2.4 parts sodium formaldehyde sulfoxolate dihydrate dissolved in 25 parts deionized water. Seventeen minutes after the catalyst addition the stirred emulsion exotherms and in 62 minutes the reaction reaches a peak temperature of 73.5° C. The polymer is isolated by coagulation as described in the first example. The polymer has a Gardner-Holdt viscosity of V–W (5% in toluene) and an oxetane oxygen value of 0.47% (theory 0.44%).

EXAMPLE 4

*Preparation of a MMA/EA/EOMMA terpolymer (70/10/20)*

This sample is prepared using the same procedure as in Example 2 except for the monomer ratios. The product isolated by coagulation has a Gardner-Holdt viscosity of U–V (5% in toluene) and an oxetane oxygen value of 1.68% (theory 1.74%).

EXAMPLE 5

*Preparation of a MMA/EA/EOMMA terpolymer by bulk polymerization (80/10/10)*

(a) Into a suitable container there are charged 800 parts MMA, 100 parts EA, 100 parts EOMMA, and .35 part azobisisobutyronitrile. The mixture is sparged with nitrogen, degassed and then polymerized at 66° C. for 18 hours. The product is a hard, clear, colorless polymer which is soluble in toluene and has a Gardner-Holdt viscosity of Y–Z (10% in toluene). The product is pulverized and ground to a fine powder.

(b) By adjustment of the monomer ratios and following the procedure of Example 5(a) above, there are obtained terpolymers of the following composition: MMA/EA/EOMMA, 85/10/5 and 70/10/20.

In the practice of this invention, the vinyl chloride resin and the acrylic copolymer additive can be blended in any convenient manner and any order. A suitable procedure, for instance, involves manually or mechanically admixing the resins in proportions as hereinabove described in an unheated container and adding the dry-blended mixture to an equal speed or differential roll speed two roll mill maintained at a temperature of about 150° C. to 180° C. Other methods of processing are equally effective. For example, the resin mixture can be added to a hot Banbury mill for fluxing and homogenizing and then fed to a hot roll mill or calendar for a sheeting operation. Still other methods of processing will occur to those skilled in the art and can be employed satisfactorily in accordance with this invention to provide a homogeneous blend of the vinyl chloride resin and acrylic copolymer additive.

INCORPORATION OF STABILIZING PROCESSING AID INTO POLYVINYL CHLORIDE

The following ingredients are dry-blended at low speed in a Waring Blendor for two minutes: polyvinyl chloride, 90 parts; terpolymer processing aid of the above examples, 10 parts, and 3 parts of barium cadmium stabilizer. After dry-blending, the samples are milled on a two-roll mill at 350° F. After 6 minutes on the mill, the processing properties are checked. They are reported below. The thermal stability of the sample is determined by placing samples (1″ x ½″ x 40 mils) in an oven at 350° F. and removing them at periodic intervals. Properties are recorded in Table I. The percentage figure in the Gardner-Holdt viscosity column refers to the viscosity of a 5% or 10% toluene solution, as the case may be.

minor proportions of other ethylenically unsaturated monomers and, blended therewith, from about 0.5 percent to about 15 percent by weight based upon said vinyl chloride resin of an acrylic copolymer of 20 to 98.5 parts methyl methacrylate, 0.5 to 40 parts ethyl acrylate,

TABLE I

| Processing and Stabilization Aid MMA/EA/EOMMA | Gardner-Holdt Viscosity | Processability | | | | Heat Stability | | | |
|---|---|---|---|---|---|---|---|---|---|
| | | Thermoplasticity | Release | Rolling Bank | Processing or Flux Time (Minutes) | Hours to definite discoloration 350° F. | Hours to char | Hours to definite discoloration 400° F. | Hours to char |
| 80/10/10 | Q-R (5%) | Good | Exc | Good plus | 1¼ | ¾ | 4 | ¼ | ¾-1 |
| 80/10/10 | M-N (5%) | Good | Exc | Good plus | 1 | ¾ | 4 | ¼ | ¾ |
| 85/10/5 | V-W (5%) | Fair plus | Exc | Good | 1¼ | ¾ | 4 | ¼ | 1 |
| 70/10/20 | U-V (5%) | Good | Exc | Good plus | 1 | ¾ | 4 | ¼ | ¾-1 |
| 80/10/10, Bulk-polymerized | Y-Z (10%) | Good plus | Exc | Good plus | 1½ | 1 | 7 | | |

The excellent processing and heat stability characteristics of the acrylic modified vinyl chloride resin composition of the present invention can be observed by inspection of Table I. In a comparison with Ba–Cd stabilized polyvinyl chloride, said polyvinyl chloride containing no acrylic copolymer processing aid, only poor or fair milling properties are observed as well as significantly decreased heat stability. In another comparison with samples of Ba–Cd stabilized polyvinyl chloride, those samples containing no processing aid have inferior ultraviolet light stability compared to samples containing the acrylic copolymer processing additive based upon Fadeometer exposure tests run with the samples.

The homogeneous thermoplastic vinyl chloride resin composition of this invention may be calendered to form smooth sheets; formed into conventionally sized molding powders and fabricated into pipes or pipe sections, building panels, home siding (replacing conventional sidings such as aluminum or asbestos), window components including window sash and rails, etc. by such diverse forming or molding operations as extrusion, injection molding, blow molding, etc.

What is claimed is:

1. A homogeneous vinyl chloride resin composition comprising a polymer selected from the group consisting of homopolymers of vinyl chloride and copolymers of vinyl chloride with minor proportions of other ethylenically unsaturated monomers and, blended therewith, a processing and stabilizing amount of an acrylic copolymer of 20 to 98.5 parts methyl methacrylate, 0.5 to 40 parts of ethyl acrylate, and 1 to 40 parts of an ether ester of the formula

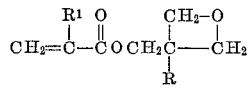

in which
R is an alkyl group of one to four carbon atoms, and R¹ is selected from the group consisting of hydrogen and methyl, all parts being by weight.

2. A homogeneous vinyl chloride resin composition comprising a medium to high molecular weight polymer selected from the group consisting of homopolymers of vinyl chloride and copolymers of vinyl chloride with minor proportions of other ethylenically unsaturated monomers and, blended therewith, from about 0.5 percent to about 15 percent by weight based upon said vinyl chloride resin of an acrylic copolymer of 20 to 98.5 parts methyl methacrylate, 0.5 to 40 parts ethyl acrylate, and 1 to 40 parts 3-ethyloxetane-3-methyl methacrylate, all parts being by weight, said acrylic copolymer being essentially linear and solube in toluene.

3. A homogeneous vinyl chloride resin composition comprising a polymer selected from the group consisting of homopolymers of vinyl chloride and copolymers of vinyl chloride with minor proportions of other ethylenically unsaturated monomers and, blended therewith, from about 0.5 percent to about 15 percent by weight based upon said vinyl chloride resin of an acrylic copolymer of 20 to 98.5 parts methyl methacrylate, 0.5 to 40 parts of ethyl acrylate and 1 to 40 parts of 3-ethyloxetane-3-methyl methacrylate, all parts being by weight.

4. A homogeneous vinyl chloride resin composition comprising a polymer selected from the group consisting of homopolymers of vinyl chloride and copolymers of vinyl chloride with minor proportions of other ethylenically unsaturated monomers and, blended therewith, from about 0.5 percent to about 15 perecnt by weight based upon said vinyl chloride resin of an acrylic copolymer of 45 to 90 parts of methyl methacrylate, 5 to 35 parts of ethyl acrylate, and 5 to 20 parts of 3-ethyloxetane-3-methyl methacrylate, all parts being by weight.

5. The composition of claim 4 in which the acrylic copolymer has a molecular weight in the range of 150,000 to 2,000,000.

6. The method of stabilizing and rendering a vinyl chloride polymer more amenable to processing at heat-softening temperatures which comprises adding a processing and stabilizing amount of an acrylic copolymer of 45 to 90 parts methyl methacrylate, 5 to 35 parts ethyl acrylate, and 5 to 20 parts 3-ethyloxetane-3-methyl methacrylate to said vinyl chloride polymer, all parts being by weight.

References Cited by the Examiner

UNITED STATES PATENTS

| 2,326,543 | 8/1943 | Macht | 260—885 |
| 3,066,043 | 11/1962 | Hechtman et al. | 260—899 |
| 3,105,838 | 10/1963 | Luskin | 260—333 |

MURRAY TILLMAN, *Primary Examiner.*

J. L. WHITE, *Assistant Examiner.*